United States Patent
Masumoto et al.

(10) Patent No.: US 8,170,328 B2
(45) Date of Patent: May 1, 2012

(54) IMAGE DISPLAY METHOD, APPARATUS, AND PROGRAM

(75) Inventors: Jun Masumoto, Ichikawa (JP); Futoshi Sakuragi, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 707 days.

(21) Appl. No.: 12/100,860

(22) Filed: Apr. 10, 2008

(65) Prior Publication Data

US 2008/0253630 A1    Oct. 16, 2008

(30) Foreign Application Priority Data

Apr. 12, 2007  (JP) ................. 2007-105271

(51) Int. Cl.
*G06K 9/00* (2006.01)
(52) U.S. Cl. ........................ 382/154; 382/128
(58) Field of Classification Search ............ 382/131, 382/154
See application file for complete search history.

(56) References Cited

U.S. PATENT DOCUMENTS

| | | | |
|---|---|---|---|
| 5,170,347 A * | 12/1992 | Tuy et al. | 345/419 |
| 5,734,384 A * | 3/1998 | Yanof et al. | 345/424 |
| 6,272,366 B1 * | 8/2001 | Vining | 600/407 |
| 7,242,402 B1 * | 7/2007 | Betting et al. | 345/424 |
| 7,269,246 B2 * | 9/2007 | Ohishi | 378/98.12 |
| 7,369,691 B2 * | 5/2008 | Kondo et al. | 382/128 |
| 7,640,050 B2 * | 12/2009 | Glenn et al. | 600/407 |
| 2002/0118869 A1 | 8/2002 | Knoplioch et al. | |
| 2002/0191822 A1 | 12/2002 | Pieper | |
| 2004/0059214 A1 * | 3/2004 | Tomoda et al. | 600/410 |

FOREIGN PATENT DOCUMENTS

| | | |
|---|---|---|
| EP | 1 063 617 A1 | 12/2000 |
| JP | 2006-246941 A | 9/2006 |
| WO | WO-2005/055147 A1 | 6/2005 |

OTHER PUBLICATIONS

Rodt et al. "3D visualisation of the middle ear and adjacent structures using reconstructed multi-slice CT datasets, correlating 3D images and virtual endoscopy to the 2D cross-sectional images" Neuroradiology, 2002, pp. 783-790.*

* cited by examiner

*Primary Examiner* — Stephen Koziol
*Assistant Examiner* — Utpal Shah
(74) *Attorney, Agent, or Firm* — Birch, Stewart, Kolasch & Birch, LLP

(57) ABSTRACT

Extracting a luminal or line-like three-dimensional structure from a three-dimensional image of a target object, then generating a projection image by projecting a portion of the entirety of the three-dimensional structure on a cross-sectional image of the target object intersecting the three-dimensional structure, the portion being a portion located within a range of a predetermined thickness from a cross-section represented by the cross-sectional image or a portion located within a range of a predetermined distance from a position where the three-dimensional structure is intersecting the cross-sectional image, and displaying the generated projection image.

6 Claims, 6 Drawing Sheets

IMAGE DISPLAY METHOD, APPARATUS, AND PROGRAM

BACKGROUND OF THE INVENTION

1. Field of the Invention

The present invention relates to an image display method, apparatus, and program for displaying a three-dimensional configuration of a tubular structure extracted from a three-dimensional image of a subject in an easy-to-observe manner. More specifically, the invention is directed to an image display method, apparatus, and program for displaying a three-dimensional configuration of a luminal structure, such as blood vessel, intestine, bronchial tube, or the like in a manner useful for observation.

2. Description of the Related Art

In the medical field, processing for extracting a three-dimensional structure, such as a core line representing structural information of an observation target luminal structure from a three-dimensional medical image of a subject obtained by CT equipment, MRI machine, ultrasonic diagnostic equipment, or the like and displaying the structure in a form useful for observation is performed, in order to facilitate observation of a three-dimensional configuration of the luminal structure of the subject, such as blood vessel, intestine, bronchial tube, or the like.

A method of simultaneously displaying an image, such as a volume rendering image in which the entirety of a-three-dimensional structure of extracted core line or the like is rendered in superimposed manner, and a multi planar reconstruction (MPR) image that orthogonally intersects the three-dimensional image at a specified arbitrary position thereof with an indicator, such as a marker or the like, attached to the intersecting position is proposed as described, for example, in Japanese Unexamined Patent Publication No. 2006-246941.

Figure 11:
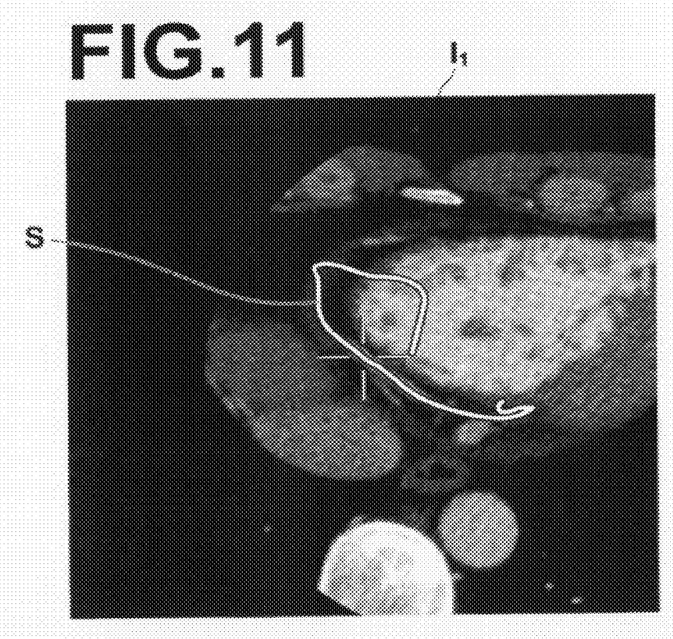
FIG. 11 illustrates an example image displayed by the conventional image display method.

When sequentially displaying MPR images of cross-sections intersecting at respective positions of an extracted three-dimensional structure along the structure, a method for providing, for example, an image $I_2$ shown in FIG. 11 is also known, in which the entirety of the extracted three-dimensional image S is superimposed on each of the cross-sectional images, and an indicator, such as a marker or the like, is attached to the intersecting position to enable an observer to easily understand to which position on the three-dimensional structure each cross-sectional image corresponds.

But, when attentively observing the intersecting state between an extracted three-dimensional structure and each cross-sectional image, for example, when checking extraction state of a three-dimensional structure of a blood vessel by sequentially observing the three-dimensional structure at each of the positions where a plurality of cross-sectional images is intersecting in the advancement direction of the structure, the conventional technique described above gives rise to the following problem. That is, in the conventional technique, the entirety of the extracted three-dimensional structure is superimposed on each cross-sectional image with an indicator, such as a marker or the like attached to the intersecting position, so that as the length of the extracted three-dimensional structure becomes long, or as the structure of the three-dimensional structure becomes complicated, the three-dimensional structure displayed in a superimposed manner becomes large, which hinders observation of a region of interest and observability is degraded.

In view of the circumstances described above, it is an object of the present invention to provide an image display method and apparatus capable of improving observability of the three-dimensional configuration of a target object. It is a further object of the present invention to provide a computer program product therefor.

SUMMARY OF THE INVENTION

A first image display method of the present invention is a method including the steps of:

extracting a luminal or line-like three-dimensional structure from a three-dimensional image of a target object;

generating a projection image by projecting a portion of the entirety of the three-dimensional structure on a cross-sectional image of the target object intersecting the three-dimensional structure, the portion being a portion located within a range of a predetermined thickness from a cross-section represented by the cross-sectional image; and displaying the generated projection image.

A second image display method of the present invention is a method including the steps of:

extracting a luminal or line-like three-dimensional structure from a three-dimensional image of a target object;

generating a projection image by projecting a portion of the entirety of the three-dimensional structure on a cross-sectional image of the target object intersecting the three-dimensional structure, the portion being a portion located within a range of a predetermined distance from a position where the three-dimensional structure is intersecting the cross-sectional image; and displaying the generated projection image.

The term "a range of a predetermined thickness from a cross-section represented by the cross-sectional image" as used herein means a range of a predetermined distance in the directions orthogonal to the cross-section, and the term "a range of a predetermined distance from a position where the three-dimensional structure is intersecting the cross-sectional image" as used herein means a range of a predetermined distance in all directions from the intersecting position.

First and second image display apparatuses of the present invention include a structure extraction means, a projection image generation means, and a display means respectively for performing the first and second image display methods respectively.

First and second image display programs of the present invention are programs for causing a computer to perform the first and second image display method respectively.

The step of generating a projection image may be a step of generating a projection image by projecting only a part of the entirety of the portion of the three-dimensional structure located within the range of the predetermined thickness or distance, the part continuing from a section of the three-dimensional structure intersecting the cross-sectional image within the range.

According to the image display method, apparatus, and program of the present invention, a luminal or line-like three-dimensional structure is extracted from a three-dimensional image of a target object, then a projection image is generated by projecting a portion of the entirety of the three-dimensional structure on a cross-sectional image of the target object intersecting the three-dimensional structure, the portion being a portion located within a range of a predetermined thickness from a cross-section represented by the cross-sectional image or a portion located within a range of a predetermined distance from a position where the three-dimensional structure is intersecting the cross-sectional image, and the generated projection image is displayed. When attentively observing the intersecting state between the three-dimensional structure and the cross-sectional image, this may provide a more suitable image for observation, in which only a limited region of interest of the three-dimensional structure is superimposed, which may improve observability of the three-dimensional configuration of a target object.

DESCRIPTION OF THE PREFERRED EMBODIMENTS

Figure 1:
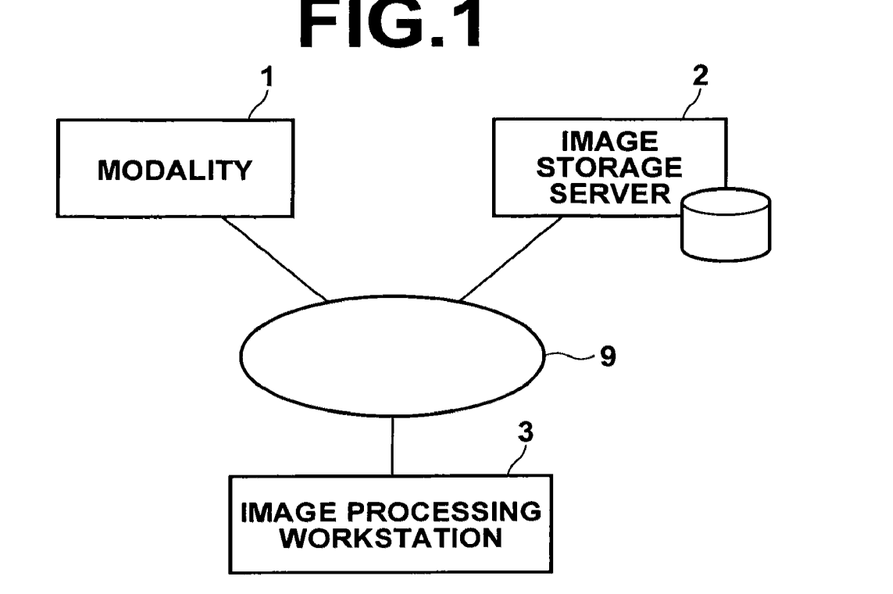
FIG. 1 is a schematic configuration diagram of a three-dimensional medical image processing system according to an embodiment of the present invention.

Hereinafter, an exemplary embodiment of the present invention will be described with reference to the accompanying drawings. FIG. 1 is a hardware configuration diagram of a three-dimensional medical image processing system, illustrating an overview thereof. As illustrated, the system includes a modality 1, an image storage server 2, and an image processing workstation 3, which are communicatably connected with each other through a network 9.

The modality 1 is used for obtaining a three-dimensional medical image V representing a subject, which is, more specifically, CT equipment, MRI machine, ultrasonic diagnostic equipment, or the like.

The image storage server 2 is a computer for storing a three-dimensional medical image V obtained by the modality 1 and a medical image generated through image processing in the image processing workstation 3 in an image database and managing them. The image storage server 2 includes a large capacity external storage device, and database management software (e.g., ORDB (Object Relational Database) management software).

The image processing workstation 3 is a computer for performing image processing on a three-dimensional medical image V obtained from the modality 1 or the image storage server 2, and displaying the generated image in response to a request from a radiological reader. The image processing workstation 3, in particular, includes an input device, such as a keyboard, a mouse, or the like, for inputting a request from a radiological reader, a main storage unit having a sufficient capacity for storing the obtained three-dimensional medical image V, and a display for displaying the generated image.

The image data storage format and communication between each unit through the network 9 are based on a protocol, such as DICOM (Digital Imaging and Communications in Medicine) or the like.

Figure 2:
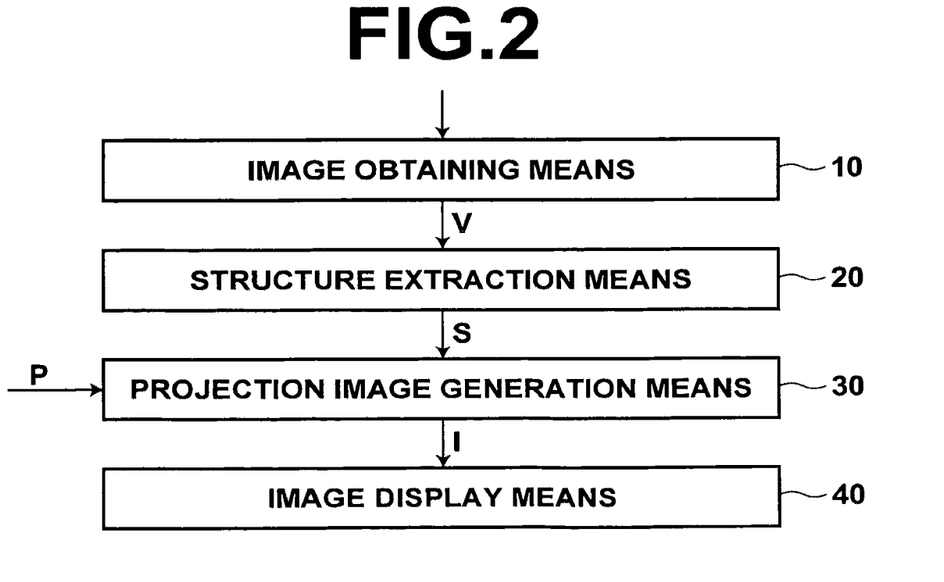
FIG. 2 is a block diagram illustrating the image processing workstation shown in FIG. 1.

FIG. 2 is a schematic block diagram of the image processing workstation 3, illustrating a schematic configuration thereof. As illustrated, the image processing workstation 3 includes an image obtaining means 10 for obtaining a three-dimensional medical image V including a target object (luminal structure) having a luminal structure, such as blood vessel, intestine, or bronchial tube from the modality 1 or image storage server 2 in response to a request from a radiological reader, a structure extraction means 20 for extracting a luminal or a line-like three-dimensional structure S of the target object from the obtained three-dimensional medical image V, a projection image generation means 30 for generating a projection image I by projecting a portion Sp of the entirety of the three-dimensional structure S located within a predetermined range R on a cross-sectional image P of the target object intersecting the three-dimensional structure S, and an image display means 40 for displaying the generated projection image I.

Next, a processing flow of the medical image processing system, in particular, a processing flow of the image processing workstation 3 for generating and displaying a projection image provided for improving observability of a three-dimensional configuration of a target object will be described.

First, the image obtaining means 10 obtains a three-dimensional medical image V of a target patient for radiological reading which includes a target object (luminal structure) having a luminal structure, such as blood vessel, intestine, bronchial tube, or the like, from the modality 1 or image storage server 2 in response to a request from a radiological reader. The three-dimensional medical image V is constituted by multi slice images which are divided into voxels and arranged in a three-dimensional coordinate space.

Next, the structure extraction means 20 extracts a line-like or luminal three-dimensional structure S, such as a core line or an interface from the target object (luminal structure) having a luminal structure, such as blood vessel, intestine, bronchial tube, or the like, included in the three-dimensional image V. More specifically, with an internal point of the target object in the three-dimensional medical image V specified by the radiological reader through the input device, such as a keyboard or a mouse, as a search start point, a determination is made as to whether or not each voxel within a region adjacent to the search point represents the target object, and with each voxel determined to represent the target object as a new search point, the search is performed in succession, thereby a smoothly curved area of the target object is obtained. Then, by thinning the obtained target object area or extracting the core line by the core line extraction method as described in Patent Document 1 described above, a line-like three-dimensional structure of the target object is extracted. As for the three-dimensional structure, for example, may be a luminal structure that can be obtained by extracting an interface of the target object.

Figure 3A:
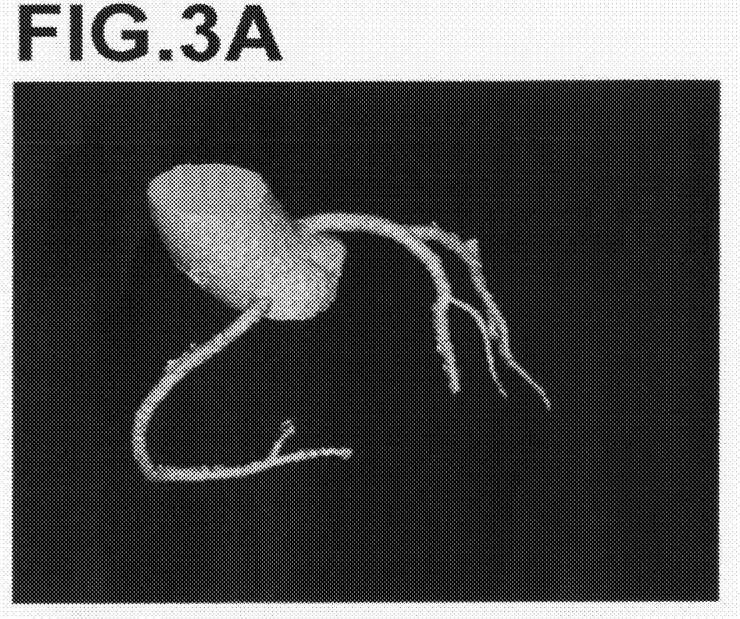
FIG. 3A illustrates an example coronary artery extracted from a three-dimensional medical image.
Figure 3B:
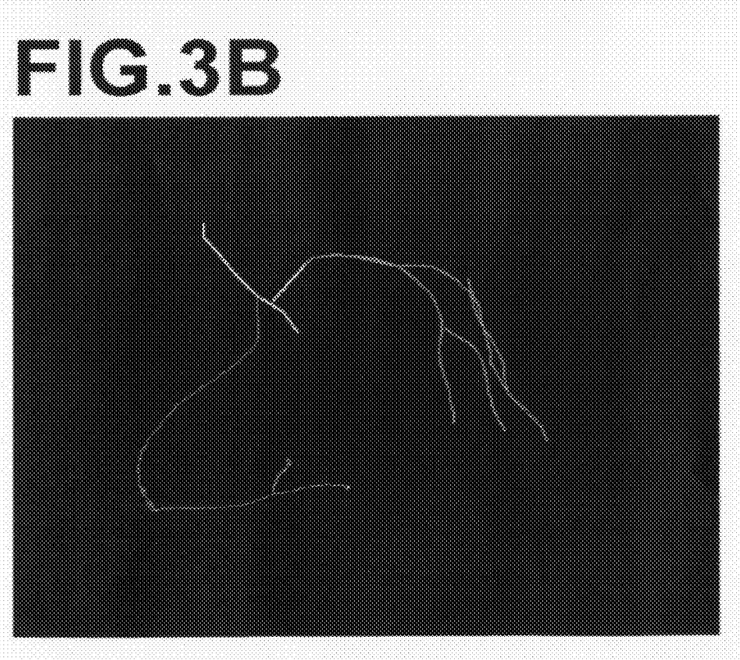
FIG. 3B illustrates an example three-dimensional structure of the coronary artery in FIG. 3A extracted by the structure extraction means 20.
Figure 4A:
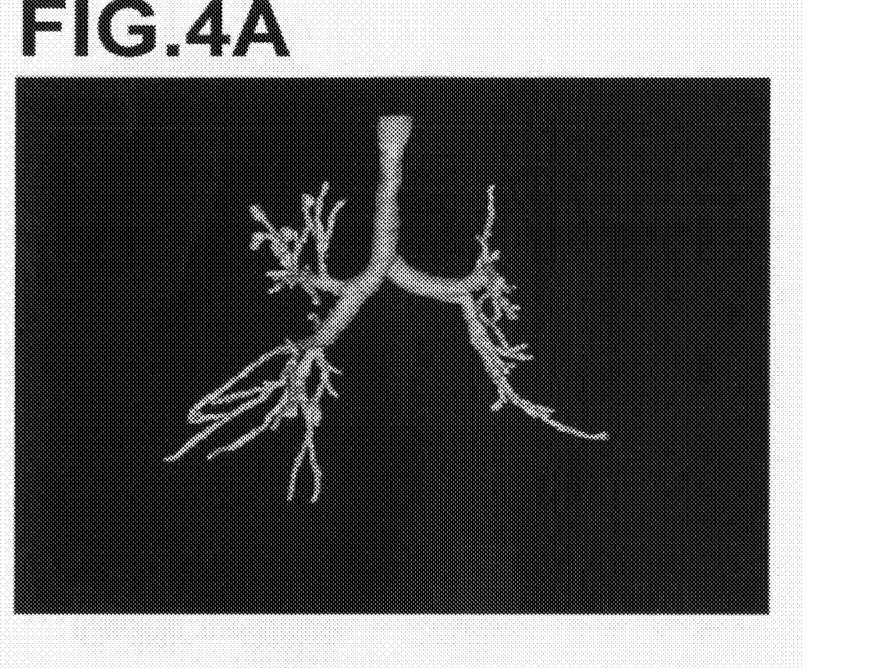
FIG. 4A illustrates example bronchial tubes extracted from a three-dimensional medical image.
Figure 4B:
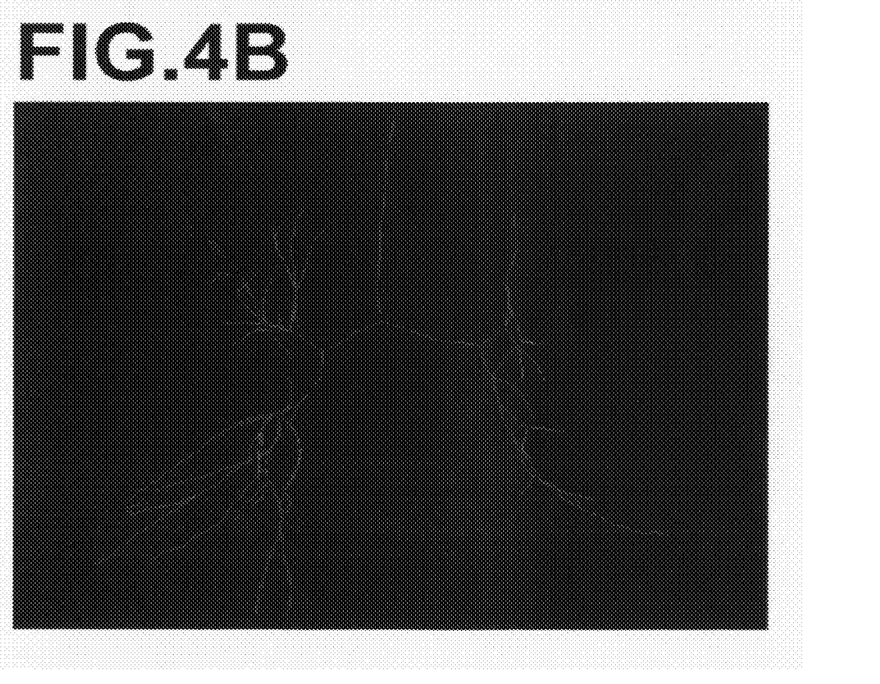
FIG. 4B illustrates an example three-dimensional structure of the bronchial tubes in FIG. 4A extracted by the structure extraction means 20.
Figure 5A:
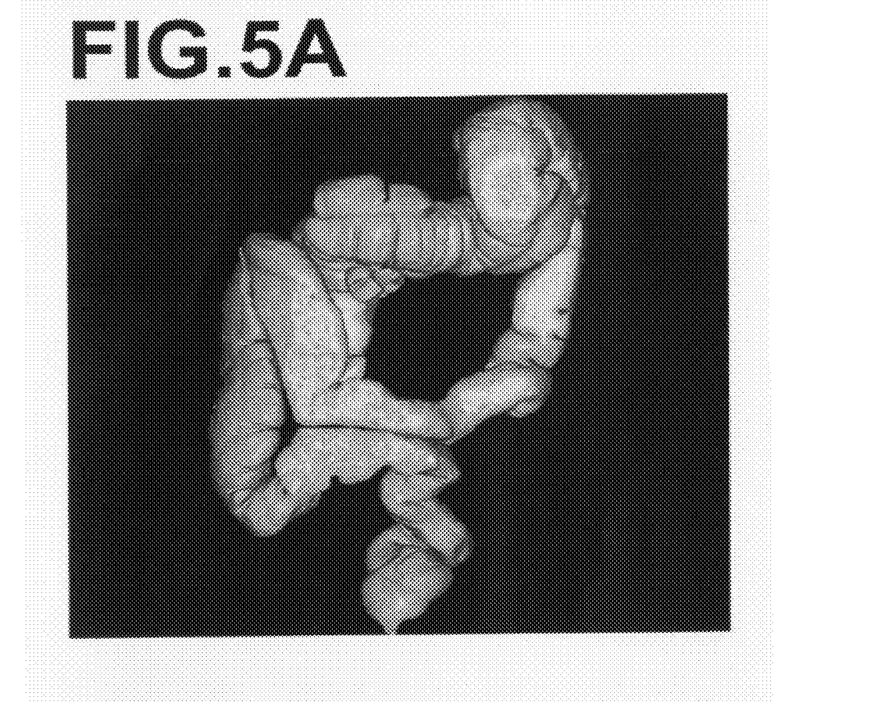
FIG. 5A illustrates an example large intestine extracted from a three-dimensional medical image.
Figure 5B:
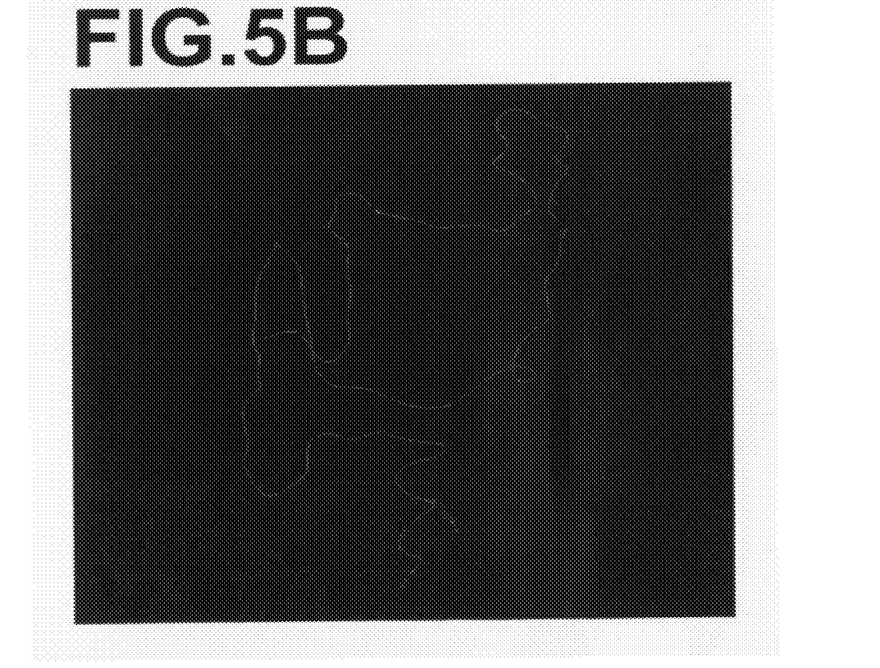
FIG. 5B illustrates an example three-dimensional structure of the large intestine in FIG. 5A extracted by the structure extraction means 20.

Examples of three-dimensional structures obtained through extraction by the structure extraction means 20 are shown in FIGS. 3, 4, and 5. FIG. 3B illustrates a three-dimensional structure of the coronary artery shown in FIG. 3A, FIG. 4B illustrates a three-dimensional structure of the bronchial tubes shown in FIG. 4A, and FIG. 5B illustrates a three-dimensional structure of the large intestine shown in FIG. 5A.

Next, a processing flow of the projection image generation means 30 for generating a projection image I by projecting a portion Sp of the entirety of a three-dimensional structure S located within a predetermined range R on a cross-sectional image P of the target object intersecting the three-dimensional structure S will be described.

Figure 6:
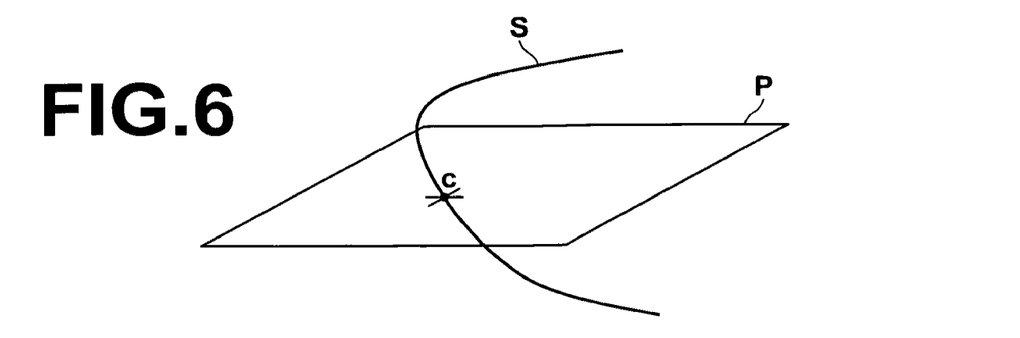
FIG. 6 is a drawing for explaining the processing of the projection image generation means 30 for generating a projection image.

As shown in FIG. 6, an arbitrary cross-sectional image P intersecting the three-dimensional structure S is obtained. For example, a cross-sectional image orthogonally intersecting the three-dimensional structure S obtained by MPR (Multi Planar Reconstruction) method at an arbitrary point C on the three-dimensional structure S specified by a radiological reader through the input device, such as a keyboard or a mouse, may be used as the cross-sectional image P.

Figure 7:
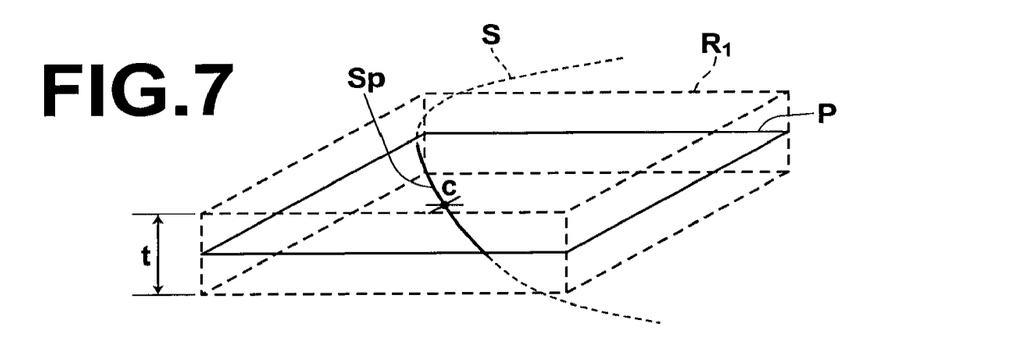
FIG. 7 is a drawing for explaining the processing of the projection image generation means 30 for generating a projection image.
Figure 8:
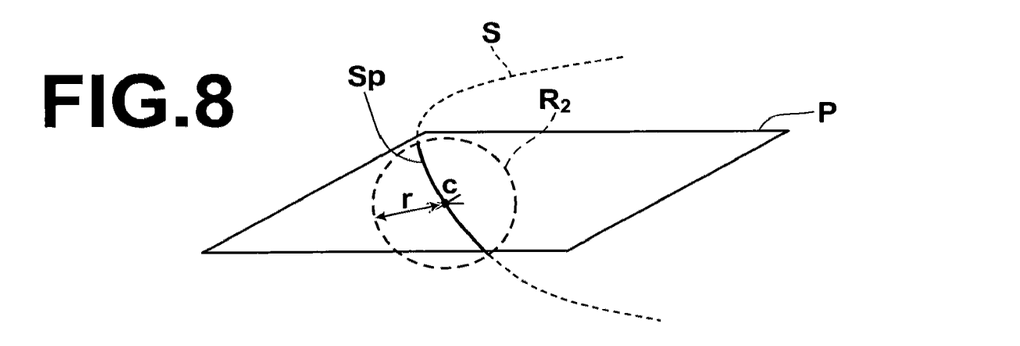
FIG. 8 is a drawing for explaining the processing of the projection image generation means 30 for generating a projection image.

Then, a projection image I is generated, in which a portion Sp of the entirety of the three-dimensional structure S located within a predetermined range R is projected on the obtained cross-sectional image P. More specifically, as shown in FIG. 7, a portion Sp of the entire three-dimensional structure S located within a range $R_1$ of a predetermined thickness t from the cross-section represented by the cross-sectional image P is projected on the cross-sectional image P to generate the projection image I. Alternatively, as shown in FIG. 8, a portion Sp of the entirety of the three-dimensional structure S located within a range $R_2$ of a predetermined distance from the position C where the three-dimensional structure is intersecting the cross-sectional image P is projected on the cross-sectional image P to generate the projection image I.

Here, the thickness t or the distance r is used for determining the range of the three-dimensional structure S to be projected and superimposed on the cross-sectional image P, and can be arbitrarily set according to a desired size of projection range of the three-dimensional structure S. For example, when a three-dimensional structure of a coronary artery is projected and displayed on a cross-section image P with a thickness of 2.5 mm to check the extraction state of the blood vessel, the appropriate value of the range $R_1$ is a thickness t around 1 cm including the cross-sectional image P. Further, the value of the thickness t or the distance r may be set such that the greater the diameter of the three-dimensional structure at the position C where the three-dimensional structure S and the cross-section image P are intersecting with each other, the greater the value.

Figure 9:
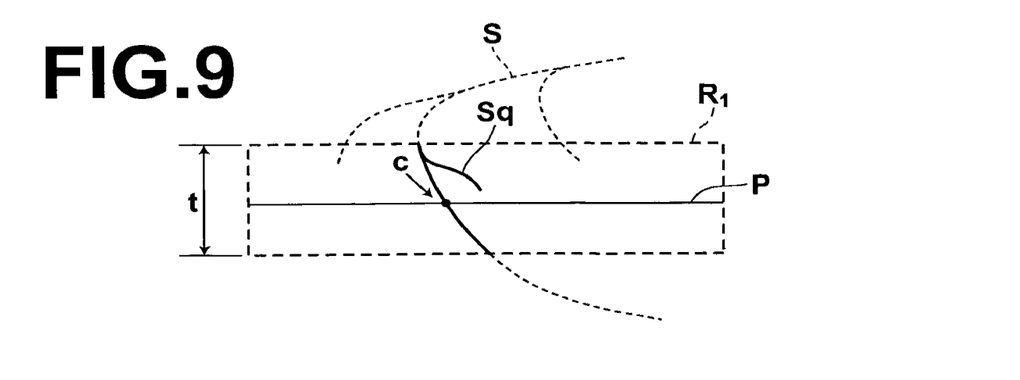
FIG. 9 is a drawing for explaining the processing of the projection image generation means 30 for generating a projection image.

If a three-dimensional structure S of a target object has a complicated tree structure, an image more clearly showing the continuity of the three-dimensional structure of the target object may be provided by, for example, in the following manner. That is, as shown in FIG. 9, of the entirety of the portion of the three-dimensional structure S located within a predetermined range R (a predetermined thickness range R1 or a predetermined distance range R2), only a part Sq continuing from a section of the three-dimensional structure S intersecting the cross-sectional image P within the range R is projected on the cross-sectional image P to generate a projection image I and the generated projection image I is displayed.

Then, the projection image I generated in the projection image generation means 30 is displayed on the display of the image processing workstation 3 by the image display means 40.

Figure 10:
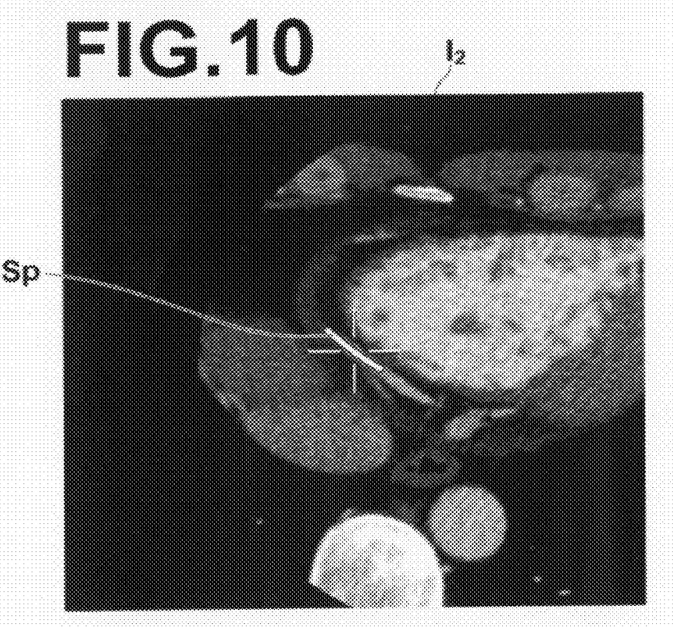
FIG. 10 illustrates an example image displayed by the image display method of the present invention.

As described above, in the three-dimensional medical image processing system, which is an embodiment of the image processing of the present invention, a luminal or line-like three-dimensional structure S is extracted from a three-dimensional image V of a target object, then a projection image is generated by projecting a portion of the entirety of the three-dimensional structure on a cross-sectional image P of the target object intersecting the three-dimensional structure, the portion being a portion located within a range $R_1$ of a predetermined thickness from a cross-section represented by the cross-sectional image P, or a portion of the entirety of three-dimensional structure located within a range $R_2$ of a predetermined distance from a position where the three-dimensional structure is intersecting the cross-sectional image, and the generated projection image I is displayed. When attentively observing the intersecting state between the three-dimensional structure and the cross-sectional image, this may provide an image on which only a limited portion of interest of the three-dimensional structure is superimposed, which is more suitable for observation, thus observability of the three-dimensional configuration of a target object may be improved. For example, FIG. 10 illustrates an example projection image $I_2$ displayed by the image display method of the present invention. FIG. 10 clearly shows that the image $I_2$ is more suitable for observing a portion adjacent to the intersecting position between the three-dimensional structure and the cross-sectional image indicated by the marker in comparison with the image $I_1$ shown in FIG. 11, which is displayed by the conventional image display method in which the entirety of an extracted three-dimensional structure is superimposed on a cross-sectional image, since the portion adjacent to the intersecting position is not blocked by the superimposed three-dimensional structure in the image $I_2$ while it is blocked in the image $I_1$.

Further, an arrangement may be adopted in which a projection image obtained by the present invention is displayed together with an image on which the entirety of a three-dimensional structure is superimposed which is generated by a volume rendering method or a maximum intensity projection method, and the intersecting state between the three-dimensional structure of the target object and a cross-sectional image is observed by referring to the entire shape of the three-dimensional structure.

What is claimed is:

1. An image display method comprising the steps of:
extracting a luminal or line-like three-dimensional structure from a three-dimensional image of a target object;
generating a projection image by projecting a portion of the entirety of the three-dimensional structure on a cross-sectional image of the target object intersecting the three-dimensional structure, the portion being a portion located within a range of a predetermined thickness from a cross-section represented by the cross-sectional image; and
displaying the generated projection image,
wherein the step of generating the projection image is a step of generating a projection image by projecting only a part of the entirety of the portion of the three-dimensional structure located within the range of the predetermined thickness, the part continuing from a section of the three-dimensional structure intersecting the cross-sectional image within the range.

2. An image display apparatus comprising:
- a structure extraction means for extracting a luminal or line-like three-dimensional structure from a three-dimensional image of a target object;
- a projection image generation means for generating a projection image by projecting a portion of the entirety of the three-dimensional structure on a cross-sectional image of the target object intersecting the three-dimensional structure, the portion being a portion located within a range of a predetermined thickness from a cross-section represented by the cross-sectional image; and
- an image display means for displaying the generated projection image,
- wherein the projection image generation means is a means for generating the projection image by projecting only a part of the entirety of the portion of the three-dimensional structure located within the range of the predetermined thickness or distance, the part continuing from a section of the three-dimensional structure intersecting the cross-sectional image within the range.

3. A non-transitory computer readable storage medium on which a program for causing a computer to perform the following steps:
- extracting a luminal or line-like three-dimensional structure from a three-dimensional image of a target object;
- generating a projection image by projecting a portion of the entirety of the three-dimensional structure on a cross-sectional image of the target object intersecting the three-dimensional structure, the portion being a portion located within a range of a predetermined thickness from a cross-section represented by the cross-sectional image; and
- displaying the generated projection image,
- wherein the step of generating the projection image is a step of generating a projection image by projecting only a part of the entirety of the portion of the three-dimensional structure located within the range of the predetermined thickness or distance, the part continuing from a section of the three-dimensional structure intersecting the cross-sectional image within the range.

4. An image display method, comprising the steps of:
- extracting a luminal or line like three dimensional structure from a three dimensional image of a target object;
- generating a projection image by projecting a portion of the entirety of the three dimensional structure on a cross sectional image of the target object intersecting the three dimensional structure, the portion being a portion located within a range of a predetermined distance from a cross section represented by the cross sectional image; and
- displaying the generated projection image;
- the generation of the projection image being performed by projecting only a part of the entirety of the portion of the three-dimensional structure located within the range of the predetermined distance, the part continuing from a section of the three-dimensional structure intersecting the cross-sectional image within the range.

5. An image display apparatus, comprising:
- a structure extraction means for extracting a luminal or line like three dimensional structure from a three dimensional image of a target object;
- a projection image generation means for generating a projection image by projecting a portion of the entirety of the three dimensional structure on a cross sectional image of the target object intersecting the three dimensional structure, the portion being a portion located within a range of a predetermined distance from a cross section represented by the cross sectional image; and
- an image display means for displaying the generated projection image;
- the projection image generation means generating the projection image by projecting only a part of the entirety of the portion of the three-dimensional structure located within the range of the predetermined distance, the part continuing from a section of the three-dimensional structure intersecting the cross-sectional image within the range.

6. A non transitory computer readable medium, having stored therein a program that causes a computer to execute an image display method, comprising the procedures of:
- extracting a luminal or line like three dimensional structure from a three dimensional image of a target object;
- generating a projection image by projecting a portion of the entirety of the three dimensional structure on a cross sectional image of the target object intersecting the three dimensional structure, the portion being a portion located within a range of a predetermined distance from a cross section represented by the cross sectional image; and
- displaying the generated projection image;
- the generation of the projection image being performed by projecting only a part of the entirety of the portion of the three-dimensional structure located within the range of the predetermined distance, the part continuing from a section of the three-dimensional structure intersecting the cross-sectional image within the range.

* * * * *